(12) United States Patent
Chase et al.

(10) Patent No.: US 7,099,936 B2
(45) Date of Patent: Aug. 29, 2006

(54) MULTI-TIER SERVICE LEVEL AGREEMENT METHOD AND SYSTEM

(75) Inventors: Jeffrey S. Chase, Durham, NC (US); Ronald P. Doyle, Raleigh, NC (US); Steven D. Ims, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 10/112,268

(22) Filed: Mar. 29, 2002

(65) Prior Publication Data

US 2003/0187970 A1    Oct. 2, 2003

(51) Int. Cl.
*G06F 15/173* (2006.01)
*G06F 17/00* (2006.01)

(52) U.S. Cl. .................................. 709/223; 705/400
(58) Field of Classification Search ............... 718/104; 709/226, 223, 229
See application file for complete search history.

(56) References Cited

U.S. PATENT DOCUMENTS

| | | | |
|---|---|---|---|
| 5,893,905 A | 4/1999 | Main et al. .................. 705/11 |
| 5,999,525 A | 12/1999 | Krishnaswamy et al. ... 370/352 |
| 6,073,175 A | 6/2000 | Tavs et al. .................. 709/226 |
| 6,144,996 A | 11/2000 | Starnes et al. .............. 709/217 |
| 6,167,445 A | 12/2000 | Gai et al. .................... 709/223 |
| 6,195,697 B1 | 2/2001 | Bowman-Amuah ......... 709/224 |
| 6,304,892 B1 | 10/2001 | Bhoj et al. .................. 709/202 |
| 6,785,704 B1* | 8/2004 | McCanne .................... 718/105 |
| 2002/0091854 A1* | 7/2002 | Smith .......................... 709/236 |

* cited by examiner

*Primary Examiner*—John Follansbee
*Assistant Examiner*—Ashok Patel
(74) *Attorney, Agent, or Firm*—Jeanine S. Ray, Esq.; Steven M. Greenberg; Carey Rodriguez Greenberg & Paul, LLP

(57) ABSTRACT

A method for managing multi-tier SLA relationships. The method can include first computing costs of utilizing edge server resources in a CDN, costs of dedicating content host resources in a content host in lieu of the utilization, and prospective revenues which can be generated by the content host providing services based on the resources to content consumers. Minimum QoS levels can be identified which must be maintained when providing the services to the content consumers according to QoS terms in established SLAs between the content host and individual ones of the content consumers. Finally, a new SLA can be established between the content host and the CDN. Importantly, the new SLA can include QoS terms for selectively allocating resources in the CDN. Moreover, the QoS terms can optimize revenues generated by the content host providing services based on the selective allocation of resources and the computed costs.

7 Claims, 2 Drawing Sheets

MULTI-TIER SERVICE LEVEL AGREEMENT METHOD AND SYSTEM

BACKGROUND OF THE INVENTION

1. Statement of the Technical Field

The present invention relates to a network system which operates according to the terms of a service level agreement, and more particularly to a network system which operates at different tiers according to the terms of tier-level service level agreements.

2. Description of the Related Art

In an efficient admissions control and capacity planning policy, minimal resources can be allocated automatically to satisfy the requirements of a specified service level agreement (SLA), leaving the remaining resources for later use. SLAs are agreements between service providers and their customers which specify a minimum level of service to be provided by the service provider on behalf of its customer. Typical SLAs include one or more network traffic terms which either limit the amount and type of resources that the subscribing customer can consume for a given rate, or guarantee the amount and quality of service (QoS) of resources that the provider will provide to the subscribing customer for a given rate.

For example, a subscribing consumer can agree to an SLA in which the consumer agrees to consume only a particular quantity of network bandwidth offered by the provider. Conversely, the SLA can require the provider to guarantee access to the subscribing consumer to at least a minimum amount of bandwidth. Also, the SLA can require the provider to provide a certain QoS over the provided minimum amount of bandwidth.

When considering the terms of an SLA, content hosts provision server resources for their subscribing customers, co-hosted server applications or services, according to the resource demands of the customers at their expected loads. Since outsourced hosting can be viewed as a competitive industry sector, content hosts must manage their resources efficiently. Logically, to ensure that the customers receive the promised level of service in the SLA, content hosts can be configured to survive a worst-case load. Yet, the worst-case approach can unnecessarily tax the resources of the content host, even when those resources are not required to service a given load. Hence, rather than over-provisioning resources in the content host, efficient admission control and capacity planning policies can be designed merely to limit rather than eliminate the risk of meeting the worst-case demand.

In this regard, an efficient resource management scheme can automatically allocate to each service of a subscribing customer only the minimal amount of resources required to meet the QoS levels specified in an SLA. In consequence, surplus resources can be withheld for use by the content host to meet the requirements of other subscribing customers. Thus, resource provisioning logic must adapt to changes in load as they occur, and the resource provisioning logic must respond gracefully to unanticipated demand surges or resource failures.

Business methods for establishing and managing SLA relationships between providers and subscribing customers have been implemented in content hosting environments. Specifically, those implemented business methods manage the cost/benefit analysis associated with resource allocation choices. Yet, content hosting environments no longer exist in a vacuum. Rather, as content hosting centers become overloaded with traffic, or as content hosting centers acquire new subscribing customers based upon QoS guarantees in an SLA, functions and data processing are removed from the content host to the edge of the network.

Existing content distribution network (CDN) models include edge processing of content requests at the edge of the CDN. These existing CDN models provide for takeover or overflow service for content hosts. Specifically, where in the takeover or overflow service model of the conventional CDN, the CDN handles all traffic direction and caching for content hosts. Alternatively, the CDN agrees to handle traffic only where specific peak traffic conditions in the content host arise. Yet, existing SLA models for managing resource allocation choices wholly ignore the complete relationship between CDN, content host and data consumer.

SUMMARY OF THE INVENTION

The present invention overcomes the limitations of conventional SLA managed relationships and provides a novel and non-obvious system and method for multi-tiered SLAs negotiated between all components in the CDN, content host, data consumer relationship. A method for managing multi-tier SLA relationships can include first computing costs of utilizing edge server resources in a CDN, costs of dedicating content host resources in a content host in lieu of the utilization, and prospective revenues which can be generated by the content host providing services based on the resources to content consumers. In particular, the computing step can be based upon the computation of costs upon allocating the resources during specified time periods, the costs varying by the specified time periods.

Minimum QoS levels can be identified which must be maintained when providing the services to the content consumers according to QoS terms in established SLAs between the content host and individual ones of the content consumers. Finally, a new SLA can be established between the content host and the CDN. Importantly, the new SLA can include QoS terms for selectively allocating resources in the CDN. Moreover, the QoS terms can optimize revenues generated by the content host providing services based on the selective allocation of resources and the computed costs. Notably, the edge server resources and the content resources can include at least one of bandwidth, CPU utilization, and memory usage.

A multi-tier SLA system can include a service provider disposed in a middle tier of a multi-tier service provider chain; an SLA established between the service provider and a service customer disposed in a lower tier of the multi-tier service provider chain; and, an additional SLA established between the service provider and an additional service provider disposed in a higher tier of the multi-tier service provider chain. In one aspect of the invention, the service provider can be a content host while the additional service provider can be a CDN. The CDN can include a configuration for serving content to the content consumer in lieu of the content host serving the content to the content consumer. In this way, the content host can meet QoS terms included in the SLA between the content host and the content consumer. The service customer, by comparison, can be a content consumer, though one skilled in the art will recognize that the content host, too, can be viewed as a service customer to the CDN.

The additional SLA can include QoS terms which have been determined both according to QoS terms in the SLA established between the content host and the content consumer, and also according to a cost analysis of utilizing edge server resources in the CDN, of dedicating content host resources in the content host in lieu of the utilization, and of prospective revenues which can be generated by the content host providing services based on the resources to the content consumers. In that regard, the edge server resources and the content resources can include at least one of bandwidth, CPU utilization, and memory usage. Furthermore, the costs analysis can include an analysis of costs of allocating the resources during specified time periods, the costs varying by the specified time periods.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system and method for managing multiple tiers of an enterprise system incorporating a CDN, one or more content hosts and one or more content consumers according to the terms of individual SLAs between each tier component. In particular, in the present invention, SLAs can be established between individual ones of the CDN, content hosts and content consumers. In that context, each of the CDN, content hosts and content consumers can be viewed not only as a service provider, but also as a service customer.

Hence a "service provider chain" can be formed in which a CDN is a service provider to a content host which can be viewed as a service customer in its relationship with the CDN. Of course, that the CDN is a service provider to the content host does not require that the CDN serve content to the content host. Rather, as a service provider to the content host, the CDN serves content to content consumers in lieu of the content host serving the content to content consumer in order for the content host to meet the terms of an SLA which has been established between the content host and the content consumer.

In any case, as will be apparent to one skilled in the art, the content host can be viewed dually as a service provider to the content consumer who can be viewed as a service customer in its relationship with the content host. Of course, where other network entities rely upon the content consumer as a source of content which the content consumer receives from the content host, the content consumer too can be viewed dually as a service provider to the other network entities.

The terms of each SLA between service provider and service customer in the network system can be dependent upon the terms of each other SLA between other related service providers and service customer in the service provider chain between the ultimate content consumer and the back-end source of the content in the network system. Importantly, instead of allocating the maximum resources deemed necessary to handle worst case loads, in the present invention, in providing a particular level of service to a service customer a service provider can consider the terms of the SLA between service customer and service provider in order to manage their respective resources in a profit-driven, optimal cost-efficient manner while meeting the terms and conditions of the SLA.

Figure 1:
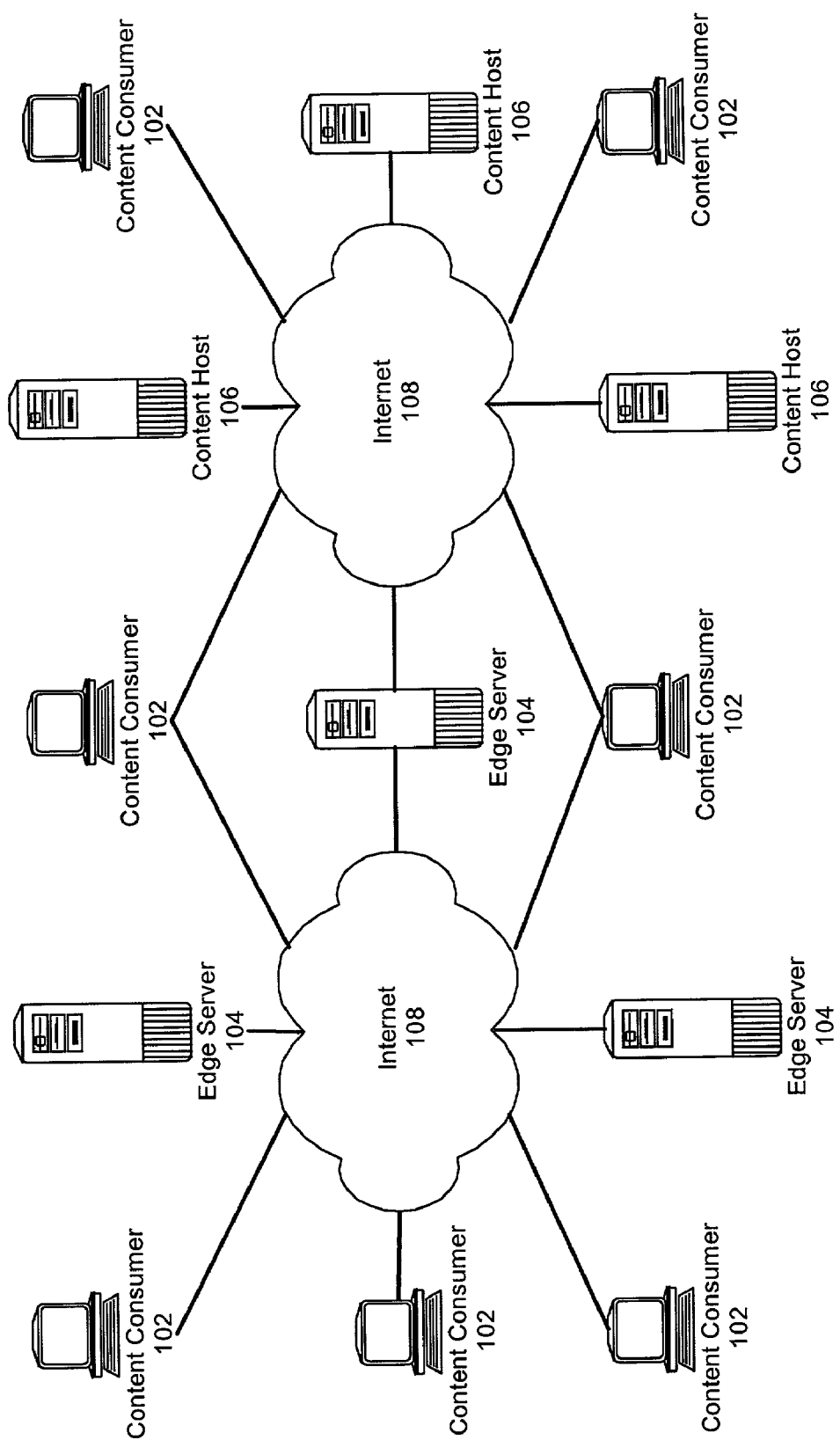
FIG. 1 is a schematic illustration of a network system in which requested content can be distributed to content consumers with the assistance of a CDN; and, FIG. 2 is a block illustration a multi-tier SLA arrangement between a CDN, content host and content consumer in the network system of FIG. 1.

FIG. 1 is a schematic illustration of a network system in which requested content can be distributed to content consumers with the assistance of a CDN. The network system can include one or more content hosts 106 configured to serve content over the Internet 108, content consumers 102 who consume content served by the content hosts 106, and edge servers 104 configured for use in a CDN for distributing content served by the content hosts 106. In accordance with the present invention, content consumers 102 can request and receive content directly from content hosts 106. To improve the responsiveness of the content hosts 106, however, requested content can be moved to the edge servers 104 of the CDN. Thus, where feasible, the edge servers 104 can serve requested content to the content consumers 102.

In contrast to the conventional case in which content can be chosen for edgification in order to enhance the responsiveness of an origin server, in the present invention content is edgified only where the performance enhancement provided by the edgification of the content can be justified. Specifically, content can be edgified where the cost to edgify the content can be justified in view of the requirements of the customer, in this case the content consumer 102. The requirements can be specified in an SLA between the content host 106 and the content consumer 102.

In this regard, in the present invention it is not always preferable that content is removed to the edge of the network in order to realize performance enhancements. Rather, only where the SLA between the content host 106 and the content consumer 102 requires the enhanced performance will content be removed to an edge server 104. Moreover, the selection and placement of the content in a particular edge server 104 can vary based upon the requirements of the SLA. Thus, the content host 106 can weigh the cost of utilizing an edge server 104 in a CDN with the cost of dedicating the resources of the content host 106 and with the cost of providing a certain QoS mandated by an SLA with a content consumer 102. In the present invention, it is an explicit presumption that all component members of the network system seek to maximize profitability within the confines of the QoS terms of an SLA.

Figure 2:
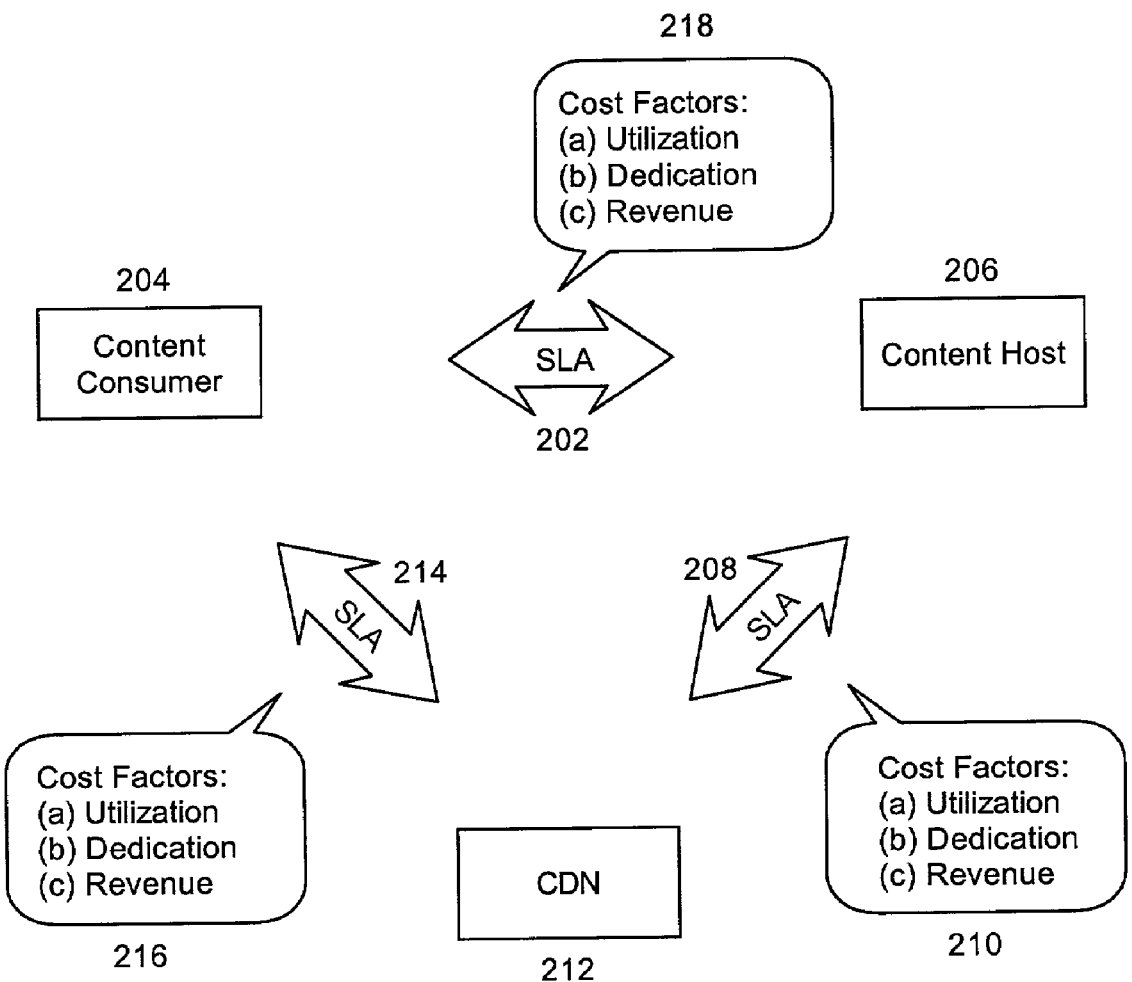

FIG. 2 is a block illustration a multi-tier SLA arrangement between a CDN, content host and content consumer in the network system of FIG. 1. In accordance with the present invention, each content consumer 204, content host 206 and CDN 212 can establish a formal relationship between one another according to the terms of respective SLAs 202, 208, 214. Each SLA 202, 208, 214 can define the level of service required by the service customer which minimally must be provided by the service provider.

Notably, as will be apparent to one skilled in the art, the content host 206 need not necessarily be a single tier network entity. Rather, as is well-known, the content host 206 in of itself can include multiple tiers, for instance a Web application server tier, a legacy enterprise application tier and a storage access tier, though the invention is not limited to the precise configuration described. Similarly, the CDN 212 can in of itself include multiple tiers of individual CDNs operating in concert with one another as is well known in the art.

Importantly, each SLA 202, 208, 214 need not provide for required resources to handle anticipated peak loads in the service customer. Rather, the service customers can consider several factors 210, 216, 218 initially, including the cost of dedicating internal resources to handle peak loads in lieu of out-sourcing the management of peak loads to the service provider. Additionally, in that the service customer itself can be a service provider to another service customer in the service provider chain, the maximization of revenues from enhanced service in view of outsourcing costs can be considered when establishing the SLA.

Notably, the cost analysis included in the factors 210, 216, 218 can account for individual resources in the service provider, including system load, assigned resources, dampened request load information, bandwidth, CPU cycles, and memory. Each resource can be assigned a cost, both in terms of outsourcing, and dedicating local resources in lieu of outsourcing. Furthermore, the costs to consumer resources can vary by time period. For instance, resource costs at mid-day can exceed costs during pre-dawn hours taking into account reduced loads during the pre-dawn hours. Thus, each service customer, be it the CDN 212, content host 206 or content consumer 204 can select optimal resource allocations in an SLA based upon the computed costs of the resources and anticipated loads.

As will be apparent to one skilled in the art, unlike prior art SLA arrangements which assign uniform costs to resources, in the present invention resources which share the same type nevertheless can have different performance and cost impacts based upon individual SLAs between components in each tier of a multi-tier architecture. Thus, the utilization of a particular amount of bandwidth between content host 206 and content consumer 202, can vary in cost from the cost of the same amount of bandwidth between the CDN 212 and the content host 206. This variance can arise simply because a multi-tier SLA arrangement permits the content consumer 202, content host 206 and CDN 212 to individually optimize revenues against anticipated costs based upon the expectations of individual SLAs both with their respective service providers and their respective service customers.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A multi-tier service level agreement (SLA) method, the method comprising the steps of:
    computing costs of utilizing edge server resources in a content distribution network (CDN);
    computing costs of dedicating content host resources in a content host in lieu of said utilization;
    computing prospective revenues which can be generated by said content host providing services to content consumers;
    identifying minimum quality of service (QoS) levels which must be maintained when providing said services to said content consumers according to QoS terms in established SLAs between said content host and individual ones of said content consumers;
    establishing a new SLA between said content host and said CDN, said new SLA comprising QoS terms for selectively allocating resources in said CDN; and
    generating said QoS terms to optimize revenues generated by said content host providing services based on;
    said selective allocation of resources,
    said computed costs of utilizing edge server resources, and
    said computed costs of dedicating content host resources.

2. The method of claim 1, wherein said edge server resources and said content host resources comprise at least one of bandwidth, CPU utilization, and memory usage.

3. The method of claim 1, wherein said computing step further comprises basing said computation of costs upon allocating said resources during specified time periods, said costs varying by said specified time periods.

4. A multi-tier service level agreement (SLA) system, comprising:
    a content host disposed in a middle tier of a multi-tier service provider chain;
    an SLA established between said content host and a content consumer disposed in a lower tier of said multi-tier service provider chain; and,
    an additional SLA established between said content host and a content distribution network (CDN) disposed in a higher tier of said multi-tier service provider chain, said additional SLA comprising quality of service (QoS) terms which have been determined both according to:
    QoS terms in said SLA established between said content host and said content consumer, and
    a cost analysis of:
    utilizing edge server resources in said CDN,
    dedicating content host resources in said content host in lieu of said utilization, and
    prospective revenues which can be generated by said content host providing services to said content consumers.

5. The system of claim 4, wherein said edge server resources and said content host resources comprise at least one of bandwidth, CPU utilization, and memory usage.

6. The system of claim 4, wherein said costs analysis comprises an analysis of costs of allocating said resources during specified time periods, said costs varying by said specified time periods.

7. The system of claim 4, wherein said CDN comprises a configuration for serving content to said content consumer in lieu of said content host serving said content to said content consumer in order for said content host to meet QoS terms included in said SLA between said content host and said content consumer.

* * * * *